Nov. 6, 1928.

N. M. BRISBOIS

PLANT PROTECTOR

Filed Aug. 3, 1926

INVENTOR.
Nicholas M. Brisbois
BY
ATTORNEYS.

Nov. 6, 1928.
N. M. BRISBOIS
PLANT PROTECTOR
Filed Aug. 3, 1926
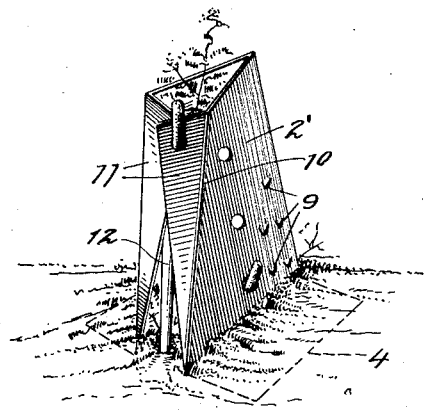
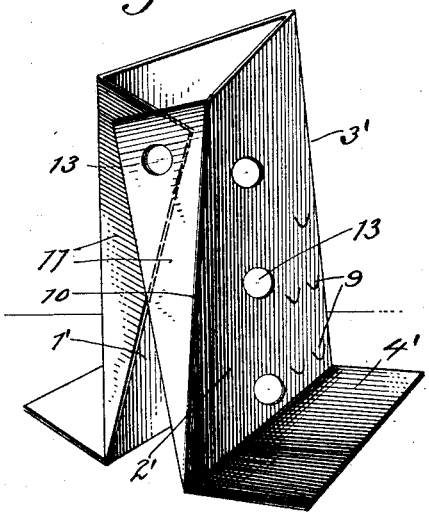
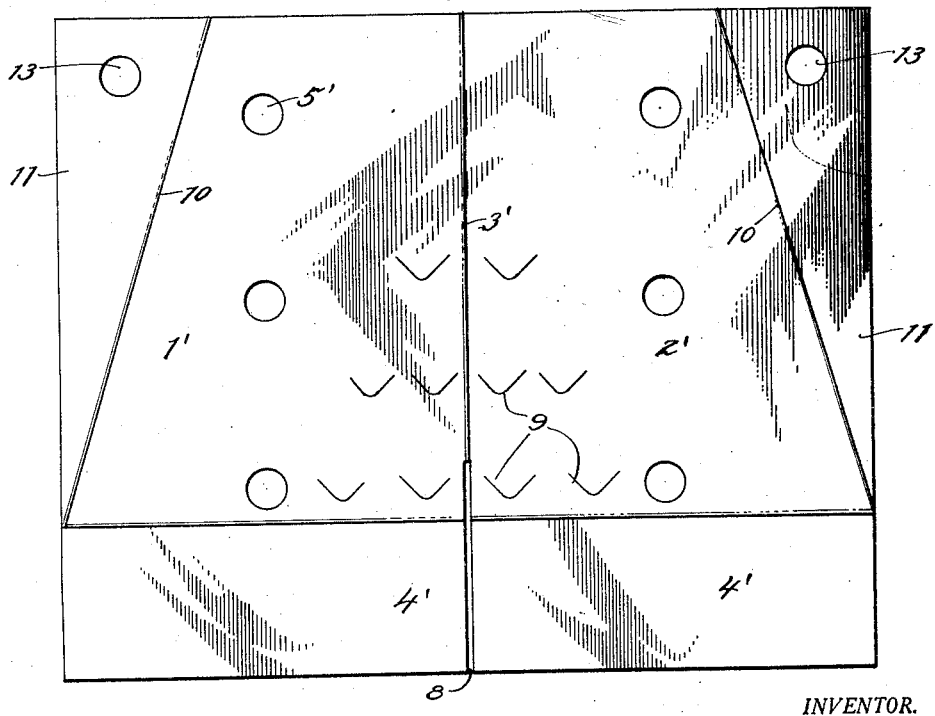
INVENTOR.
Nicholas M. Brisbois.
BY
ATTORNEYS.

Patented Nov. 6, 1928.

1,690,716

UNITED STATES PATENT OFFICE.

NICHOLAS M. BRISBOIS, OF STOCKTON, CALIFORNIA, ASSIGNOR TO NATIONAL PAPER PRODUCTS COMPANY, OF SAN FRANCISCO, CALIFORNIA, A CORPORATION OF CALIFORNIA.

PLANT PROTECTOR.

Application filed August 3, 1926. Serial No. 126,788.

This invention relates to plant protectors to promote the growth of fruits, vegetables, vines, and young trees by protecting the same from the natural elements tending to injure them or to retard their growth. The primary object of the invention is to provide a very efficient plant protector which can be cheaply and easily made of heavy waterproof paper.

In the accompanying drawings I have illustrated certain specific embodiments of my invention, but it will be understood that the invention can be otherwise embodied and that the drawings are not to be construed as defining or limiting the scope of the invention, the claims appended to this specification being relied upon for that purpose.

Referring to the figures of the drawings.

Figure 1:
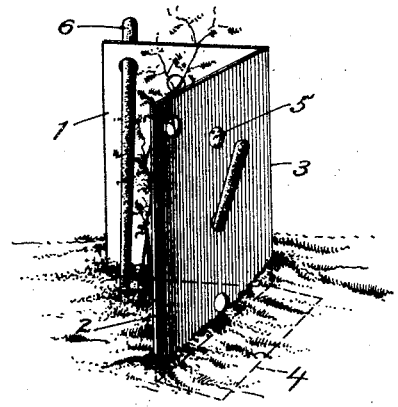
Fig. 1 is a perspective view of one of my protectors in use.
Figure 2:
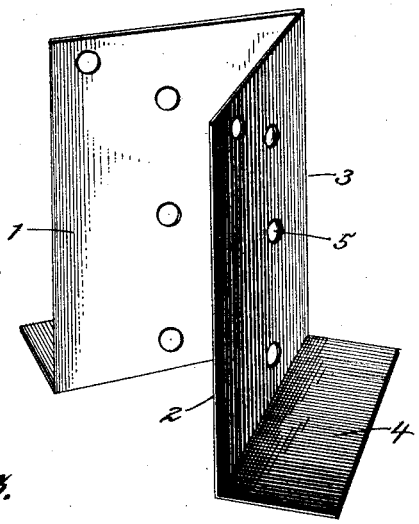
Fig. 2 is an enlarged perspective view of the protector.
Figure 3:
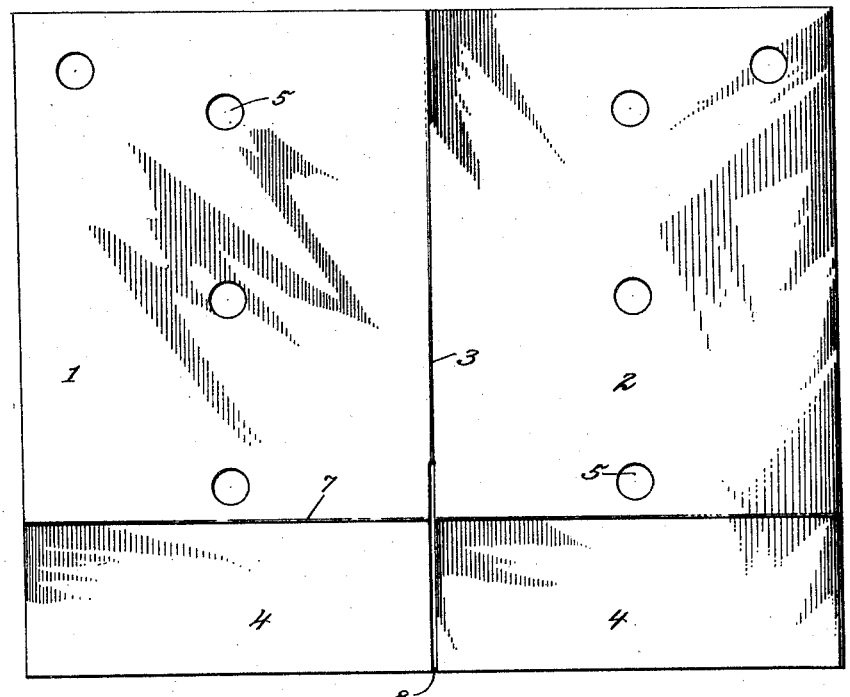
Fig. 3 is a further enlarged side elevation showing how the protector is made from a flat sheet.

Figs. 4, 5, and 6, correspond respectively to Figs. 1, 2, and 3, but show a somewhat modified protector.

Referring first to Figs. 1, 2, and 3 of the drawings, 1 and 2 indicate a pair of heavy paper wings connected for relative pivotal movement at 3 along one side edge of each wing. An anchor flap 4 is secured in like manner to the bottom edge of each wing. Holes 5 are preferably formed through the wings to receive anchoring sticks 6.

The protector shown in Figs. 1 and 2 is made from a single flat sheet as shown in Fig. 3. This sheet is scored along the line 3 to form the two elements 1 and 2, and at 7 to provide the anchor flaps 4. The sheet is slotted at 8 to permit the separation and independent movement of the anchor flaps.

The use of my invention is believed to be obvious. The scored line 3 permits relative adjustment of the wings 1 and 2 to accommodate the plant to be protected. When set in place about the plant the anchor flaps 4 are covered with soil to anchor the protector. The protector is also further anchored and braced by anchoring sticks 6 stuck into the soil and extending through the holes 5.

The protector shown in Figs. 4, 5, and 6 is in general the same as that shown in Figs. 1, 2, and 3, but somewhat modified as to certain details. The parts shown in Figs. 4, 5, and 6, which correspond to those shown in Figs. 1, 2, and 3, are indicated by the same reference characters primed. In addition to the holes 5 the wings 1' and 2' are formed with ventilating slots 9, and the wings are also scored at 10 in a manner permitting the corners 11 to overlap each other as shown in Figs. 4 and 5.

The slots 9 permit the circulation of air into and through the protector. These slots will also tend to insure greater permanency of the protector, since if they were not there the protector would be subjected to the full blasts of wind, thus limiting its life. Also these slots prevent the wind from passing over the top of the protector and making a back lash which would tend to ruin the plant. The two corner flaps 11 can be clipped together or secured by the anchoring stick 12 passing through the registering holes 13.

The protector shown in Figs. 4, 5, and 6, has the following advantages: (1) It affords greater strength at the point where the returning stick 12 engages the holes 13; (2) it affords the vines or plants an opportunity to make their exit through the top of the protector; (3) it permits the entire closure of the protector on all sides; (4) it limits the flat surface of the protector in a manner cutting down the wind resistance.

The protectors are preferably made from card-board of a suitable weight treated with a waterproofing solution to make them impervious to the elements. This treatment will preferably include .024 chip rosin sized on both sides. The outside of the protector should be black in order to draw the sun's rays and concentrate the heat thereof onto the growing plant.

Having thus described my invention, what I claim and desire to secure by Letters Patent is:

1. A plant protector comprising a pair of heavy paper wings connected for relative pivotal movement along one side edge of each wing, and anchor flaps connected to the bottom edges of the wings.

2. A plant protector comprising a pair of heavy paper wings connected for relative pivotal movement along one side edge of each wing, anchor flaps connected to the bottom edges of the wings, and means provided on the wings for receiving other anchoring means.

NICHOLAS M. BRISBOIS.